US011179915B2

(12) United States Patent
Nakamura

(10) Patent No.: US 11,179,915 B2
(45) Date of Patent: *Nov. 23, 2021

(54) TOUCH PANEL ELECTRODE COMPRISING TWO OR MORE FIRST ELECTRODE PATTERNS, AND TWO OR MORE SECOND ELECTRODE PATTERNS, TOUCH PANEL, AND DISPLAY DEVICE

(71) Applicant: FUJIFILM Corporation, Tokyo (JP)

(72) Inventor: Hiroshige Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,267

(22) Filed: Feb. 20, 2020

(65) Prior Publication Data
US 2020/0192504 A1 Jun. 18, 2020

Related U.S. Application Data

(63) Continuation of application No. 16/121,324, filed on Sep. 4, 2018, now Pat. No. 10,606,426, which is a
(Continued)

(30) Foreign Application Priority Data

Oct. 22, 2013 (JP) ................................. 2013-219241

(51) Int. Cl.
*G06F 3/044* (2006.01)
*B32B 15/02* (2006.01)
*B32B 15/04* (2006.01)

(52) U.S. Cl.
CPC .............. *B32B 15/02* (2013.01); *B32B 15/04* (2013.01); *G06F 3/0445* (2019.05);
(Continued)

(58) Field of Classification Search
CPC .......... G06F 3/044; G06F 2203/04112; G06F 3/0445; B32B 15/02; B32B 15/04; B32B 2307/202; B32B 2457/208
See application file for complete search history.

(56) References Cited

U.S. PATENT DOCUMENTS

| 8,269,108 B2 * | 9/2012 | Kunishi ................... G06F 3/045 174/113 R |
| 8,531,432 B2 * | 9/2013 | Moriwaki ............... G06F 3/044 345/174 |

(Continued)

FOREIGN PATENT DOCUMENTS

| EP | 2 765 490 A1 | 8/2014 |
| JP | 2004-221564 A | 8/2004 |

(Continued)

OTHER PUBLICATIONS

Advisory Action dated Mar. 2, 2018 in U.S. Appl. No. 15/087,282.
(Continued)

*Primary Examiner* — Chad M Dicke
(74) *Attorney, Agent, or Firm* — Birch, Stewart, Kolasch & Birch, LLP

(57) ABSTRACT

A touch panel electrode includes two or more first electrode patterns; and two or more second electrode patterns, in which the first electrode pattern and the second electrode pattern overlap each other being insulated with a distance of equal to or less than 150 μm, the first electrode pattern and the second electrode pattern extend perpendicular to each other, each of the first electrode pattern and the second electrode pattern is a combination of a plurality of cells formed by thin metal wires, and the area of an overlapping portion between the first electrode pattern and the second electrode pattern is greater than 1 mm$^2$ and equal to or less than 8 mm$^2$.

15 Claims, 9 Drawing Sheets

Related U.S. Application Data continuation of application No. 15/087,282, filed on Mar. 31, 2016, now Pat. No. 10,528,193, which is a continuation of application No. PCT/JP2014/075409, filed on Sep. 25, 2014.

(52) U.S. Cl.
CPC ... *B32B 2307/202* (2013.01); *B32B 2457/208* (2013.01); *G06F 2203/04112* (2013.01)

(56) References Cited

U.S. PATENT DOCUMENTS

| | | | | |
|---|---|---|---|---|
| 9,092,102 | B2* | 7/2015 | Kono | H03K 17/9622 |
| 9,395,855 | B2* | 7/2016 | Nakamura | G06F 3/044 |
| 10,042,455 | B2* | 8/2018 | Kawamura | G06F 3/0416 |
| 10,071,902 | B2* | 9/2018 | Buchanan | G01N 29/022 |
| 10,234,975 | B2* | 3/2019 | Zhai | G06F 3/0412 |
| 2003/0052867 | A1* | 3/2003 | Shigetaka | G06F 3/044 |
| | | | | 345/173 |
| 2007/0236466 | A1* | 10/2007 | Hotelling | G06F 3/0414 |
| | | | | 345/173 |
| 2011/0102370 | A1 | 5/2011 | Kono | |
| 2011/0115727 | A1* | 5/2011 | Feng | G06F 3/0412 |
| | | | | 345/173 |
| 2012/0299868 | A1* | 11/2012 | Bhagavat | G06F 3/0446 |
| | | | | 345/174 |
| 2013/0009653 | A1 | 1/2013 | Fukushima | |
| 2013/0135231 | A1* | 5/2013 | Park | G06F 3/0443 |
| | | | | 345/173 |
| 2013/0161070 | A1 | 6/2013 | Lee et al. | |
| 2013/0265247 | A1* | 10/2013 | Yang | G06F 3/044 |
| | | | | 345/173 |
| 2013/0278521 | A1 | 10/2013 | Kim | |
| 2013/0341070 | A1* | 12/2013 | Kim | G06F 3/044 |
| | | | | 174/250 |
| 2014/0002757 | A1* | 1/2014 | Nagami | G02F 1/1309 |
| | | | | 349/12 |
| 2014/0027263 | A1* | 1/2014 | Tanabe | H05K 3/10 |
| | | | | 200/600 |
| 2014/0062934 | A1* | 3/2014 | Coulson | G06F 3/0447 |
| | | | | 345/174 |
| 2014/0125626 | A1* | 5/2014 | Yang | G06F 3/0412 |
| | | | | 345/174 |
| 2014/0152608 | A1* | 6/2014 | Peng | G06F 3/044 |
| | | | | 345/174 |
| 2014/0152916 | A1* | 6/2014 | Nakamura | G06F 3/044 |
| | | | | 349/12 |
| 2014/0168136 | A1* | 6/2014 | Ouyang | G06F 1/182 |
| | | | | 345/174 |
| 2014/0184950 | A1* | 7/2014 | Chu | G06F 3/041 |
| | | | | 349/12 |
| 2014/0238730 | A1 | 8/2014 | Nakamura | |
| 2015/0002464 | A1* | 1/2015 | Nishioka | G02F 1/13338 |
| | | | | 345/174 |
| 2015/0049260 | A1* | 2/2015 | Yashiro | H05B 33/12 |
| | | | | 349/12 |
| 2015/0241907 | A1* | 8/2015 | Tokuno | G06F 1/16 |
| | | | | 345/173 |
| 2016/0266427 | A1 | 9/2016 | Nagami | |
| 2020/0192504 | A1* | 6/2020 | Nakamura | B32B 15/02 |

FOREIGN PATENT DOCUMENTS

| | | |
|---|---|---|
| JP | 2009-259003 A | 11/2009 |
| JP | 2012-163933 A | 8/2012 |
| KR | 10-2011-0051208 A | 5/2011 |
| WO | WO 2013/089085 A1 | 6/2013 |

OTHER PUBLICATIONS

Chinese Office Action for corresponding Chinese Application No. 201480052068.2, dated Dec. 12, 2018, with English translation.
Chinese Office Action for corresponding Chinese Application No. 201480052068.2, dated Sep. 6, 2018, with English translation.
Chinese Office Action, dated Feb. 6, 2018, for corresponding Chinese Application No. 201480052068.2, with an English translation.
Chinese Office Action, dated Mar. 18, 2019, for corresponding Chinese Application No. 201480052068.2, with an English translation.
English Translation of international Preliminary Report on Patentability for PCT/JP2014/075409 (including PCT/IB/326; PCT/IB/373, PCT/ISA/237), dated Apr. 26, 2016.
European Office Action, dated Mar. 5, 2018, for corresponding European Application No. 14855973.5.
Extended European Search Report, dated Sep. 20. 2016, for European Application No. 14855973.5.
International Search Report for PCT/JP2014/075409 (PCT/ISA/210) dated Nov. 25, 2014.
Korean Notification of Reason for Refusal for Korean Application No. 10-2016-7010086, dated Jul. 18, 2017, with an English translation.
Notice of Allowance issued in copending U.S. Appl. No. 16/121,324 dated Nov. 20, 2019.
Notice of Allowance issued in U.S. Appl. No. 15/087,282 dated Oct. 2, 2019.
Office Action dated Aug. 4, 2017 in U.S. Appl. No. 15/087,282.
Office Action issued in copending U.S. Appl. No. 16/121,324 dated Jan. 4, 2019.
Office Action issued in copending U.S. Appl. No. 16/121,324 dated Jul. 31, 2019.
Office Action issued in U.S. Appl. No. 15/087,282 dated Feb. 13, 2019.
Office Action issued in U.S. Appl. No. 15/087,282 dated Jul. 30, 2019.
Office Action issued in U.S. Appl. No. 15/087,282 dated Oct. 1, 2018.
Office Action dated May 4, 2018 in U.S. Appl. No. 15/087,282.
Office Action dated Nov. 16, 2017 in U.S. Appl. No. 15/087,282.
Written Opinion of the International Searching Authority for PCT/JP2014/075409 (PCT/ISA/237) dated Nov. 25, 2014.

* cited by examiner

TOUCH PANEL ELECTRODE COMPRISING TWO OR MORE FIRST ELECTRODE PATTERNS, AND TWO OR MORE SECOND ELECTRODE PATTERNS, TOUCH PANEL, AND DISPLAY DEVICE

CROSS-REFERENCE TO RELATED APPLICATIONS

This application is a Continuation of U.S. application Ser. No. 16/121,324 filed on Sep. 4, 2018, which is a Continuation of U.S. application Ser. No. 15/087,282 filed on Mar. 31, 2016 (now U.S. Pat. No. 10,528,193 issued on Jan. 7, 2020), which is a Continuation of PCT International Application No. PCT/JP2014/075409 filed on Sep. 25, 2014, which claims priority under 35 U.S.C § 119(a) to Japanese Patent Application No. 2013-219241 filed on Oct. 22, 2013. Each of the above application(s) is hereby expressly incorporated by reference, in its entirety, into the present application.

BACKGROUND OF THE INVENTION

1. Field of the Invention

The present invention relates to a touch panel electrode, and more particularly, to a touch panel electrode suitable for a touch panel. In addition, the invention relates to a touch panel including the conductive film and a display device including the touch panel.

2. Description of the Related Art

In recent years, a conductive film which is used in a touch panel has drawn attention as a conductive film provided in a display device. This touch panel is mainly applied to a small device, such as a PDA (portable information terminal) or a mobile phone. Increasing the size of the touch panel will be considered for application to, for example, personal computer displays.

Regarding a future trend, since electrodes according to the related art are made of indium tin oxide (ITO) (for example, JP2009-259003A), they have high resistance and a large size. As a result, the transmission speed of a current between the electrodes is low and a response speed (the time from the touch of a fingertip to the detection of a touch position) is low.

A structure will be considered in which a plurality of grids formed by thin wires made of metal (thin metal wires) are arranged to form an electrode to reduce surface electrical resistance. For example, JP2004-221564A discloses a method for forming thin metal wires. In addition, a conductive film for a touch panel has been proposed which has a conductive pattern including a plurality of large grids, each of which is a combination of a plurality of small grids, and a medium grid that electrically connects the large grids (see JP2012-163933A). JP2012-163933A also discloses an example in which a first conductive film having a conductive pattern (first conductive pattern) that is arranged in one direction and a second conductive film having a conductive pattern (second conductive pattern) that is arranged in the other direction (a direction perpendicular to the one direction) are stacked.

SUMMARY OF THE INVENTION

However, in a case in which the above-mentioned structure is applied to a capacitive touch panel, a method which stacks the first conductive film and the second conductive film is generally used, as disclosed in JP2012-163933A. In this case, a portion between the large grid of the first conductive pattern and the large grid of the second conductive pattern and an intersection portion between the first conductive pattern and the second conductive pattern are touch position detection portions. It is considered that the size (for example, the area) of the detection portion needs to be defined in order to improve the accuracy of detection.

However, in the related art, the size of the detection portion, particularly, the size of the intersection portion of the first conductive pattern and the second conductive pattern has not been verified.

The invention has been made in view of the above-mentioned problems and an object of the invention is to provide a conductive film in which a plurality of first electrode patterns and a plurality of second electrode patterns, each of which includes a plurality of cells formed by thin metal wires, intersect each other and the area of an intersection portion between the first electrode pattern and the second electrode pattern is defined to improve the accuracy of detection (S/N ratio) and which is suitable for a touch panel. Another object of the invention is to provide a touch panel including the conductive film and a display device including the touch panel.

[1] According to the invention, there is provided a conductive film including a base, two or more first electrode patterns, and two or more second electrode patterns. The first electrode pattern and the second electrode pattern face each other, with the base interposed therebetween, and intersect each other. Each of the first electrode pattern and the second electrode pattern is a combination of a plurality of cells formed by thin metal wires. The area of an intersection portion between the first electrode pattern and the second electrode pattern is greater than 1 $mm^2$ and less than 20 $mm^2$. Here, the "cells" have a two two-dimensional lattice or grid shape formed by a plurality of thin metal wires.

[2] In the invention, preferably, the area of the intersection portion is equal to or greater than 2 $mm^2$ and equal to or less than 16 $mm^2$.

[3] In the invention, among a plurality of cells of the second electrode pattern which are included in one intersection portion and are arranged in a direction in which the first electrode pattern extends, a distance between a leading end of a cell that is located at one end and a leading end of a cell that is located at the other end may be a first width of the intersection portion along the first electrode pattern in a top view. Among a plurality of cells of the first electrode pattern which are included in one intersection portion and are arranged in a direction in which the second electrode pattern extends, a distance between a leading end of a cell that is located at one end and a leading end of a cell that is located at the other end may be a second width of the intersection portion along the second electrode pattern in a top view. The area of the intersection portion may be the product of the first width and the second width.

[4] In this case, preferably, at least four cells are arranged within the first width and at least four cells are arranged within the second width. In this case, it is possible to ensure conductivity in the intersection portion of the first electrode pattern and conductivity in the intersection portion of the second electrode pattern.

[5] In the intersection portion, the position of a plurality of cells forming the intersection portion in the first electrode pattern may deviate from the position of a plurality of cells forming the intersection portion in the second electrode pattern in a top view.

[6] In this case, preferably, cells forming the first electrode pattern and cells forming the second electrode pattern have the same size.

[7] In the invention, preferably, the surface electrical resistance of the first electrode pattern and the surface electrical resistance of the second electrode pattern are equal to or greater than 0.1 ohms/square and equal to or less than 300 ohms/square.

[8] In this case, preferably, in the first electrode pattern or the second electrode pattern with at least higher surface electrical resistance, the shape of an envelope which virtually connects the ends of the thin metal wires includes a curved shape.

[9] In the invention, preferably, a gap corresponding to at least the average diameter of the cells is formed between a portion other than the intersection portion in the first electrode pattern and a portion other than the intersection portion in the second electrode pattern in a top view.

[10] Alternatively, it is preferable that a gap that is equal to or greater than 200 μm is formed between a portion other than the intersection portion in the first electrode pattern and a portion other than the intersection portion in the second electrode pattern in a top view.

[11] According to the invention, there is provided a touch panel including the above-mentioned conductive film.

[12] According to the invention, there is provided a display device including the touch panel.

As described above, according to the conductive film of the invention, a plurality of first electrode patterns and a plurality of second electrode patterns, each of which includes a plurality of cells formed by thin metal wires, intersect each other and the area of an intersection portion between the first electrode pattern and the second electrode pattern is defined to improve the accuracy of detection (S/N ratio). Therefore, it is possible to provide a conductive film suitable for a touch panel. In addition, it is possible to provide a touch panel including the conductive film and a display device including the touch panel.

DESCRIPTION OF THE PREFERRED EMBODIMENTS

Hereinafter, an embodiment in which a conductive film according to the invention is applied to, for example, a touch panel will be described with reference to FIGS. 1 to 9. In the specification, for the term "to" indicating a numerical range, values which are arranged before and after the term "to" are used as a lower limit and an upper limit.

Figure 1:
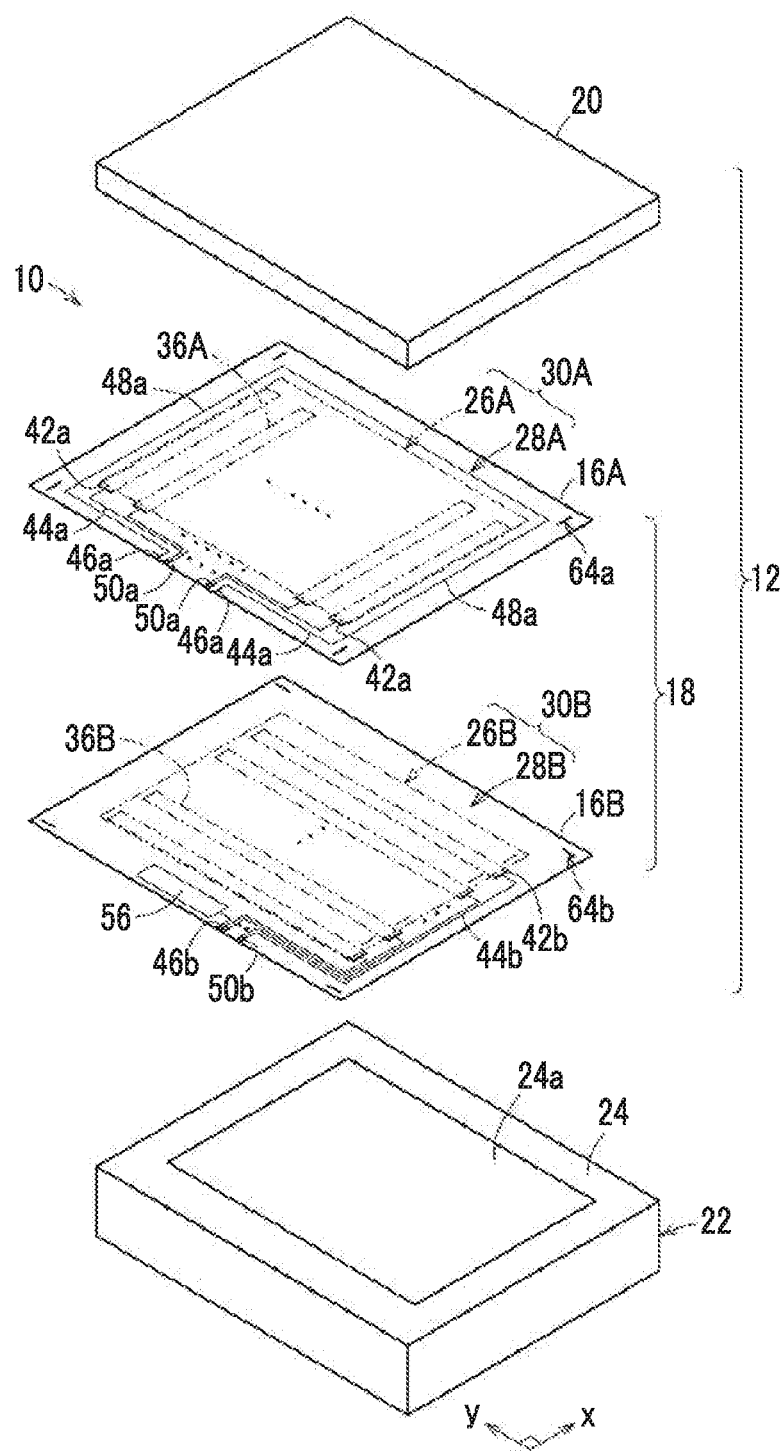
FIG. 1 is an exploded perspective view illustrating an example of a structure in which a conductive film according to an embodiment is applied to a touch panel.
Figure 2:
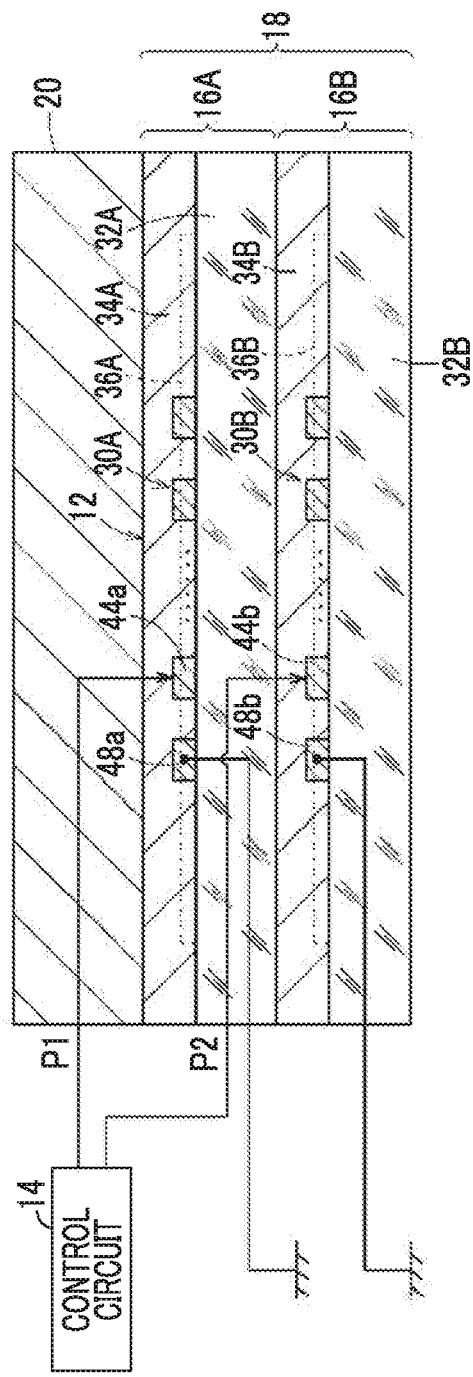
FIG. 2 is a diagram illustrating an example of the cross-sectional structure of a laminated conductive film and an example of a control system (self-capacitance type).

As illustrated in FIG. 1, a touch panel 10 to which a conductive film according to this embodiment is applied includes a sensor body 12 and a control circuit 14 (which is, for example, an IC circuit: see FIG. 2). The sensor body 12 includes a laminated conductive film 18 obtained by stacking a first conductive film 16A and a second conductive film 16B and a cover layer 20 which is made of, for example, glass and is formed on the laminated conductive film 18. The laminated conductive film 18 and the cover layer 20 are provided on a display panel 24 in a display device 22 such as a liquid crystal display. The first conductive film 16A and the second conductive film 16B include first and second sensor regions 26A and 26B which correspond to a display screen 24a of the display panel 24 and first and second terminal wiring regions 28A and 28B (so-called frames) which correspond to an outer peripheral portion of the display panel 24, respectively, as viewed from the top.

As illustrated in FIG. 2, the first conductive film 16A includes a first transparent base 32A, a first conductive portion 30A which is formed on the surface of the first transparent base 32A, and a first transparent adhesive layer 34A which is formed so as to cover the first conductive portion 30A.

Figure 3:
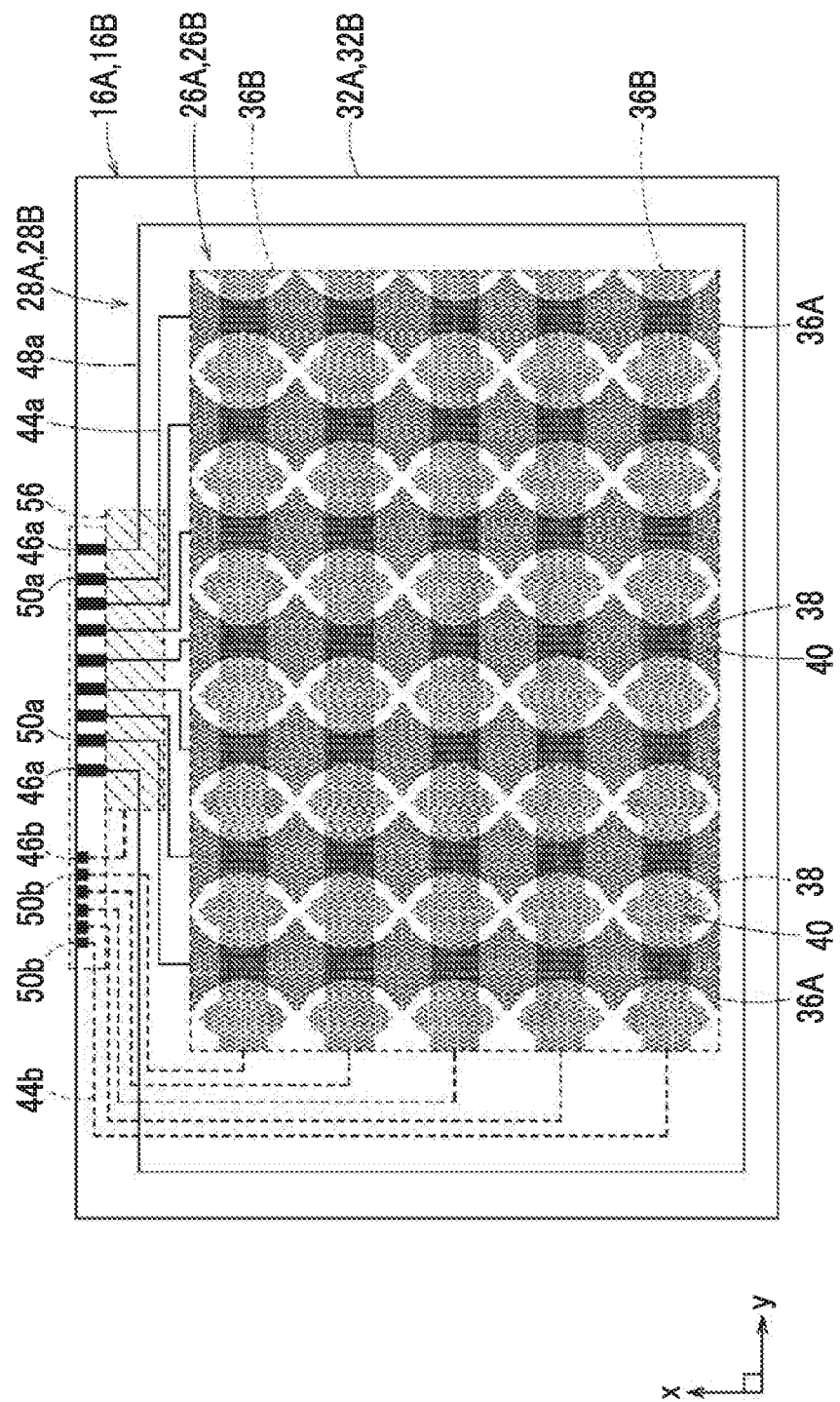
FIG. 3 is a plan view illustrating a main portion of a first conductive film and a second conductive film, as viewed from the top.

As illustrated in FIGS. 1 and 3, a plurality of first electrode patterns 36A, which are transparent conductive layers including thin metal wires, are formed in the first sensor region 26A. The first electrode patterns 36A include mesh patterns 40 (see FIG. 3) formed by combining a plurality of cells 38 (see FIG. 3), extend in a first direction (x direction), and are arranged in a second direction (y direction) perpendicular to the first direction.

In the first conductive film 16A having the above-mentioned structure, a first terminal wiring portion 44a, which is a metal wire, is electrically connected to one end of each first electrode pattern 36A through a first connection portion 42a.

That is, in the first conductive film 16A which is applied to the touch panel 10, as illustrated in FIG. 3, the plurality of first electrode patterns 36A are arranged in a first sensor region 26A and a plurality of first terminal wiring portions 44a which are drawn from each first connection portion 42a (which are not illustrated in FIG. 3) are arranged in the first terminal wiring region 28A. In addition, as illustrated in FIGS. 1 and 3, a first ground line 48a is formed outside the first terminal wiring portion 44a such that it surrounds the first sensor region 26A and is connected from one first ground terminal portion 46a to the other first ground terminal portion 46a, in order to obtain a shield effect.

In the example illustrated in FIG. 1, the external shape of the first conductive film 16A is a rectangular shape in a top view and the external shape of the first sensor region 26A is also a rectangular shape in a top view. Of course, the external shape is not limited to the rectangular shape and may be various shapes, such as a square shape, a polygonal shape, and a circular shape. In the first terminal wiring region 28A, in addition to the pair of first ground terminal portions 46a, a plurality of first terminal portions 50a are formed in a central portion of the periphery corresponding to one long side of the first conductive film 16A in a length direction so as to be arranged in the length direction of the long side. In addition, a plurality of first connection portions 42a are arranged in a line along one long side (a long side that is closest to one long side of the first conductive film 16A: the y direction) of the first sensor region 26A. The first terminal wiring portion 44a is drawn from each first connection portion 42a to a substantially central portion of one long side of the first conductive film 16A and is electrically connected to the corresponding first terminal portion 50a.

Figure 4:
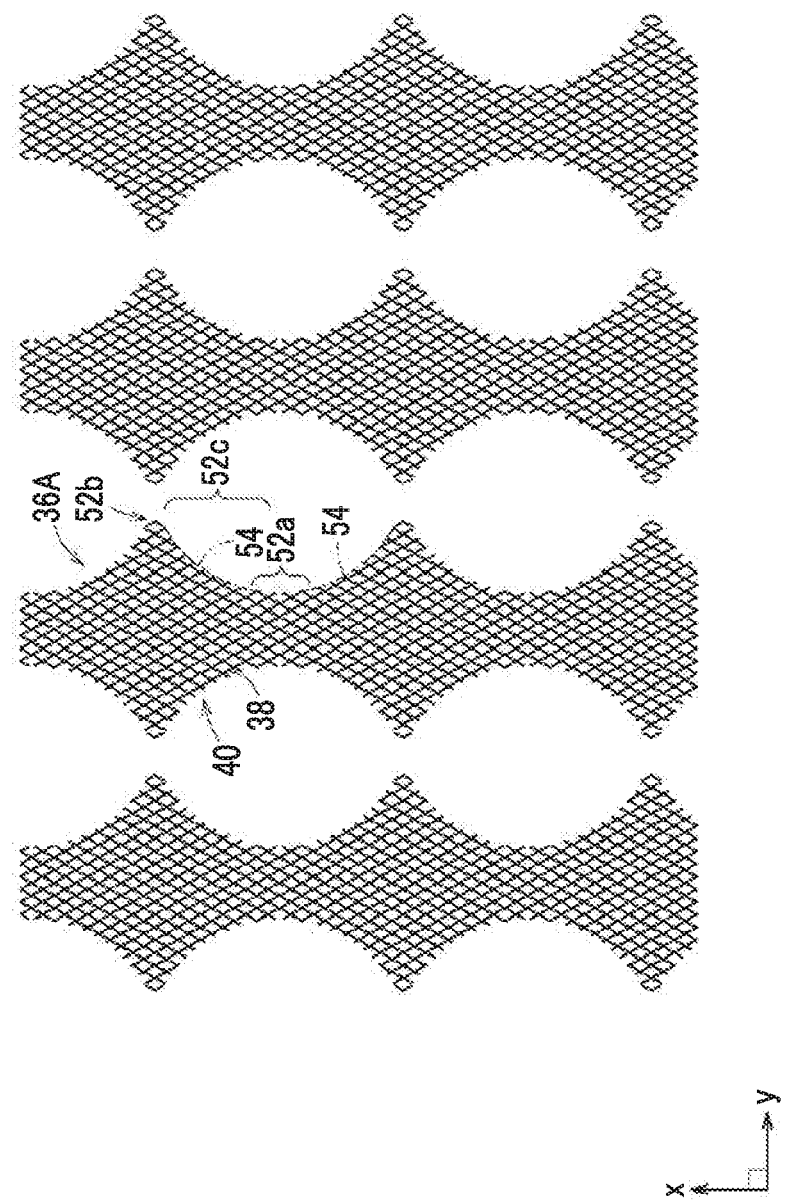
FIG. 4 is a plan view illustrating an example of the first electrode pattern, as viewed from the top.

As illustrated in FIG. 4, the first electrode pattern 36A extends in the first direction (x direction) and has a shape in which the narrowest portions 52a are arranged at regular intervals and the widest portions 52b are arranged at regular intervals. In addition, each first electrode pattern 36A includes a tapered portion 52c of which the width is gradually reduced from the widest portion 52b to the narrowest portion 52a. In particular, in the tapered portion 52c, an envelope 54 which virtually connects the ends of the thin metal wires has a curved shape. Of course, the tapered portion 52c may be narrowed stepwise or linearly. However, the curved shape makes it possible to reduce the resistance value of the tapered portion 52c. As a result, it is possible to suppress a significant reduction in conductivity.

A dummy layer (not illustrated) which is electrically insulated from the first electrode patterns 36A is formed between the first electrode patterns 36A on the surface of the first transparent base 32A. The dummy layer includes thin metal wires, similarly to the first electrode pattern 36A, and functions as a camouflage layer which makes the first electrode pattern 36A inconspicuous. The dummy layer is not used as an electrode. Of course, the dummy layer may not be formed. In addition, in the first electrode pattern 36A, the pattern, of which the width increases or decreases, is given as an example. However, this is not essential and is a preferred aspect. For example, the above-mentioned structure is preferably applied to an electrode pattern having a substantially rectangular shape.

Similarly, as illustrated in FIG. 2, the second conductive film 16B includes a second transparent base 32B, a second conductive portion 30B which is formed on the surface of the second transparent base 32B, and a second transparent adhesive layer 34B which is formed so as to cover the second conductive portion 30B.

As illustrated in FIGS. 1 and 3, a plurality of second electrode patterns 36B, which are transparent conductive layers including thin metal wires, are formed in the second sensor region 26B. The second electrode patterns 36B include mesh patterns 40 (see FIG. 3) formed by combining a plurality of cells 38 (see FIG. 3), extend in the second direction (y direction), and are arranged in the first direction (x direction).

In the second conductive film 16B having the above-mentioned structure, a second terminal wiring portion 44b, which is a metal wire, is electrically connected to one end of each second electrode pattern 36B through a second connection portion 42b. In the second terminal wiring region 28B, an electrode film 56 is formed at a position that faces the first terminal wiring portion 44a of the first conductive film 16A. The electrode film 56 is electrically connected to a second ground terminal portion 46b.

Figure 5:
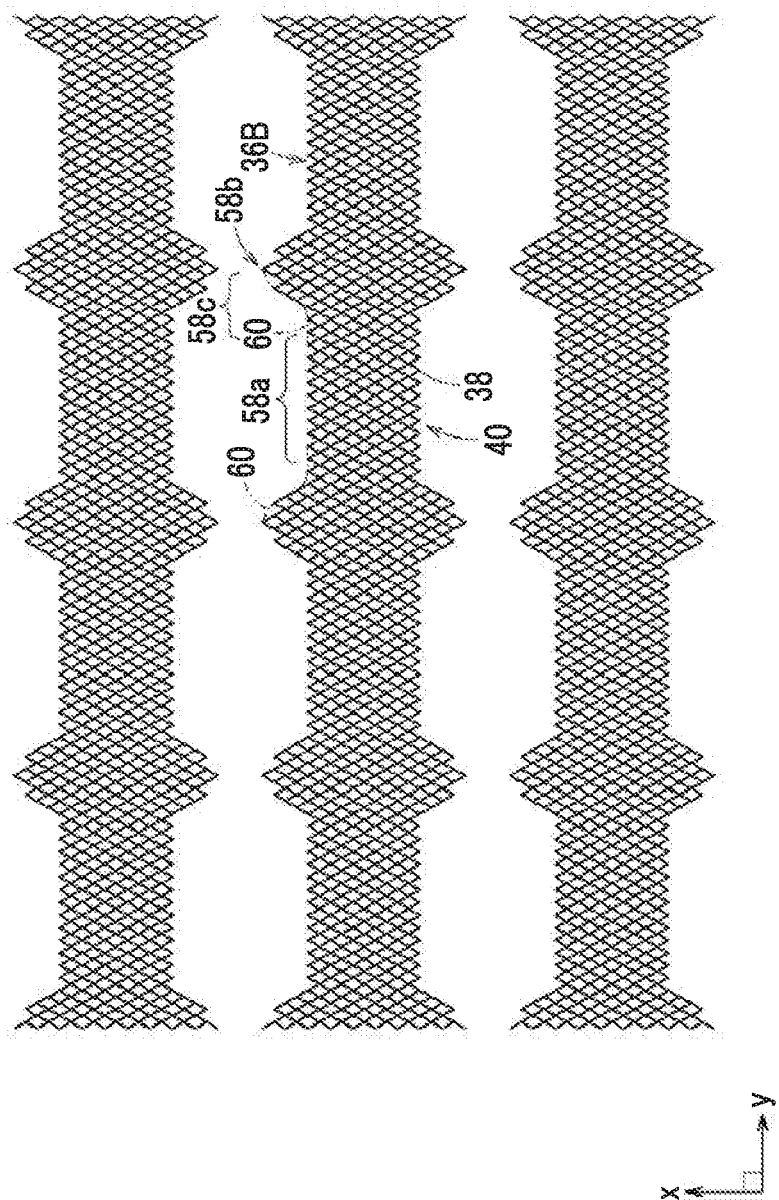
FIG. 5 is a plan view illustrating an example of the second electrode pattern, as viewed from the top.

As illustrated in FIG. 5, the second electrode pattern 36B extends in the second direction (y direction) and has a shape in which the narrowest portions 58a are arranged at regular intervals and the widest portions 58b are arranged at regular intervals. In addition, each second electrode pattern 36B includes a tapered portion 58c of which the width is gradually reduced from the widest portion 58b to the narrowest portion 58a. In particular, in the tapered portion 58c, an envelope 60 which virtually connects the ends of the metal thin wires has a curved shape.

A dummy layer (not illustrated) which is electrically insulated from the second electrode patterns 36B is formed between the second electrode patterns 36B on the surface of the second transparent base 32B. The dummy layer includes metal thin wires, similarly to the second electrode pattern 36B, and functions as a camouflage layer which makes the second electrode pattern 36B inconspicuous. The dummy layer is not used as an electrode. Of course, the dummy layer may not be formed. In addition, in the second electrode pattern 36B, the pattern, of which the width increases or decreases, is given as an example. However, this is not essential and is a preferred aspect. For example, the above-mentioned structure is preferably applied to an electrode pattern having a substantially rectangular shape.

Figure 6:
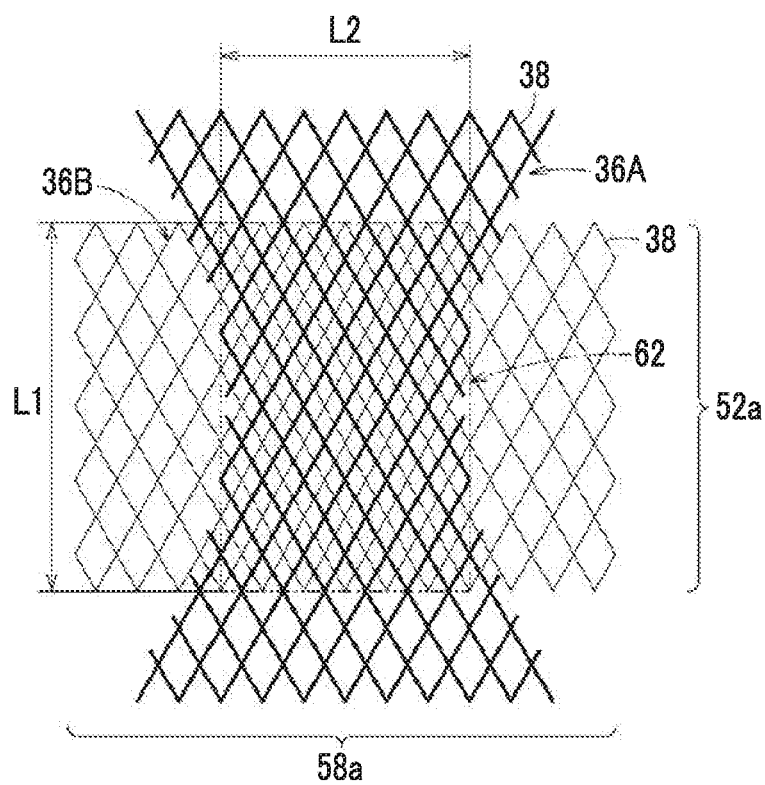
FIG. 6 is a plan view illustrating a state in which the first electrode pattern and the second electrode pattern intersect with each other to form an intersection portion, as viewed from the top.

For example, when the first conductive film 16A is laminated on the second conductive film 16B to form the laminated conductive film 18, the first electrode patterns 36A and the second electrode patterns 36B intersect each other, as illustrated in FIG. 3. Specifically, as illustrated in FIG. 6, the narrowest portion 52a of the first electrode pattern 36A and the narrowest portion 58a of the second electrode pattern 36B face each other, that is, intersect each other, with the first transparent base 32A (see FIG. 2) interposed therebetween.

In particular, in this embodiment, an intersection portion 62 between the first electrode pattern 36A and the second electrode pattern 36B forms a sensing portion for sensing a position (referred to as a touch position) which a finger approaches or touches. That is, in the first electrode pattern 36A, the narrowest portion 52a is used to form the intersection portion 62 and the widest portion 52b and the tapered portion 52c are used to reduce surface electrical resistance. This structure is the same as that in the second electrode pattern 36B.

The area of the intersection portion 62 is preferably greater than 1 mm$^2$ and less than 20 mm$^2$ and more preferably equal to or greater than 2 mm$^2$ and equal to or less than 16 mm$^2$.

The area of the intersection portion 62 can be calculated as follows. That is, among a plurality of cells 38 of the second electrode pattern 36B which are included in one intersection portion and are arranged in a direction in which the first electrode pattern 36A extends, a distance L1 between the leading end of a cell 38 which is located at one end and the leading end of a cell 38 which is located at the other end is a first width L1 of the intersection portion 62 along the first electrode pattern 36A in a top view. Similarly, among a plurality of cells 38 of the first electrode pattern 36A which are included in one intersection portion and are arranged in a direction in which the second electrode pattern 36B extends, a distance L2 between the leading end of a cell 38 which is located at one end and the leading end of a cell 38 which is located at the other end is a second width L2 of the intersection portion 62 along the second electrode pattern 36B in a top view. The area of the intersection portion 62 is the product of the first width L1 and the second width L2. In a case in which the first electrode pattern 36A and the second electrode pattern 36B form a plurality of intersection portions 62, the areas of the plurality of intersection portions 62 are calculated by the above-mentioned calculation methods and are averaged. Even if all of the intersection portions 62 do not fall in the range, the effect of the invention is obtained.

When the area of the intersection portion 62 is too small, there is a concern that the electric resistance of the first electrode pattern 36A and the second electrode pattern 36B will increase. In this case, for example, the time constant of the first electrode pattern 36A and the second electrode pattern 36B increases. As a result, the accuracy of detection of the touch position is reduced. On the other hand, for example, in a case in which the embodiment is applied to a capacitive touch panel, when the area of the intersection portion 62 is too large, a change in capacitance due to the approach or touch of a finger of the human is relatively small, that is, the S/N ratio of a detection signal is low and the accuracy of detection is reduced.

For this reason, the area of the intersection portion 62 is set to the above-mentioned range. In this case, it is possible to improve the accuracy of detection of the touch position and to achieve a conductive film suitable for the touch panel 10.

Each cell 38 has a polygonal shape. Examples of the polygon include a triangle, a quadrangle (for example, a square, a rectangle, a parallelism, or a trapezoid), a pentagon, and a hexagon. In addition, some of the sides forming the polygon may be curved. The cells 38 may have a random shape. That is, the cells 38 may have different shapes. It is preferable that the length of one side of the cell 38 is in the range of 200 µm to 300 µm. When the length of one side is too small, an opening ratio and transmittance are reduced, which results in a reduction in transparency. On the other hand, when the length of one side is too large, the opening ratio and transmittance are improved, but the electric resistance of the first electrode pattern 36A and the second electrode pattern 36B increases. As a result, the accuracy of detection of the touch position is reduced. In a case in which the length of one side of the cell 38 is in the above-mentioned range, it is possible to maintain high transparency. When the conductive film is attached to the display panel 24 of the display device 22, it is possible to view a displayed image without discomfort.

The width of the thin metal wire is preferably equal to or greater than 0.1 µm and equal to or less than 15 µm, more preferably equal to or greater than 1 µm and equal to or less than 9 µm, and most preferably equal to or greater than 2 µm and equal to or less than 7 µm. It is preferable that the surface electrical resistance of the first electrode pattern 36A and the second electrode pattern 36B is in the range of 0.1 ohms/square to 300 ohms/square. It is preferable that the lower limit of the surface electrical resistance is equal to or greater than 1 ohms/square, 3 ohms/square, 5 ohms/square, and 10 ohms/square. It is preferable that the upper limit of the surface electrical resistance is equal to or less than 200 ohms/square, 100 ohms/square, 70 ohms/square, and 50 ohms/square.

From the above description, it is preferable that at least four cells 38 having one side with a length of 200 µm to 300 µm are arranged within the first width L1 of the intersection portion 62 and at least four cells 38 having one side with a length of 200 µm to 300 µm are arranged within the second width L2 of the intersection portion 62. In this case, it is possible to improve the opening ratio and transmittance and to reduce the electric resistance of the first electrode pattern 36A and the second electrode pattern 36B.

In addition, it is preferable that the position of a plurality of cells 38 forming the intersection portion 62 in the first electrode pattern 36A deviates from the position of a plurality of cells 38 forming the intersection portion 62 in the second electrode pattern 36B in a top view. In this case, it is preferable that the cells 38 forming the first electrode pattern 36A and the cells 38 forming the second electrode pattern 36B have the same size (the same length of one side). That is, since the cells with the same size are arranged in each first electrode pattern 36A and each second electrode pattern 36B, a local change in the resistance of a certain electrode pattern is not large. Therefore, it is not necessary to provide a circuit or an arithmetic process for removing a variation in resistance or capacitance in an IC (driving IC) for driving the touch panel 10. As a result, it is possible to reduce a load applied to the driving IC.

It is preferable that, in a top view, in the intersection portion 62, the vertex (intersection point) of the cell 38 forming the second electrode pattern 36B is located at the center of the cell 38 forming the first electrode pattern 36A, the vertex (intersection point) of the cell 38 forming the first electrode pattern 36A is located at the center of the cell 38 forming the second electrode pattern 36B, and cells having a size that is a quarter of the size of the cell 38 forming the first electrode pattern 36A and the second electrode pattern 36B are arranged. In this case, the cells 38 are not locally seen and visibility is improved (the thin metal wires are not seen). In addition, in the first electrode pattern 36A and the second electrode pattern 36B, in portions other than the intersection portion 62, a cross-shaped dummy pattern (a pattern which is electrically insulated from the cell 38) may be formed in an opening portion of each cell 38 such that cells having a size that is a quarter of the size of the cell 38 seem to be arranged. In this case, there is no change in the density of the cells 38 in the intersection portion 62 and the other portions. It is possible to further improve visibility.

It is preferable that, in a top view, a gap between a portion other than the intersection portion 62 in the first electrode pattern 36A and a portion other than the intersection portion 62 in the second electrode pattern 36B is equal to or greater than 200 µm that is at least the average diameter of the cells 38. When the gap is small, initial capacitance is formed even in the portion other than the intersection portion 62. As a result, a change in capacitance due to the approach or contact of a finger of the human is relatively small and the accuracy of detection is reduced. For this reason, the gap is set in the above-mentioned range. In this case, initial capacitance is not formed in the portion other than the intersection portion 62 and it is possible to improve the accuracy of detection of the touch position.

In a case in which the laminated conductive film 18 is used in the touch panel 10, the cover layer 20 is stacked on the first conductive film 16A and the first terminal wiring portions 44a which are drawn from a plurality of first electrode patterns 36A of the first conductive film 16A and the second terminal wiring portions 44b which are drawn from a plurality of second electrode patterns 36B of the second conductive film 16B are connected to the control circuit 14 (see FIG. 2) that controls, for example, a scanning operation.

A self-capacitance method or a mutual capacitance method can be preferably used as a touch position detection method.

As illustrated in FIG. 2, in the self-capacitance method, the control circuit 14 sequentially supplies a first pulse signal P1 for detecting a touch position to the first terminal wiring portions 44a and sequentially supplies a second pulse signal P2 for detecting a touch position to the second terminal wiring portions 44b.

When a fingertip comes into contact with or approaches the upper surface of the cover layer 20, the capacitance between the ground (GND) and the intersection portion 62 which faces the touch position increases. Then, the waveform of a transmission signal from the first electrode pattern 36A and the second electrode pattern 36B corresponding to the intersection portion 62 is different from the waveforms of transmission signals from the first electrode patterns 36A and the second electrode patterns 36B corresponding to other intersection portions 62. Therefore, the control circuit 14 calculates the touch position on the basis of the transmission signal from the first electrode pattern 36A and the second electrode pattern 36B corresponding to the intersection portion 62.

Figure 7:
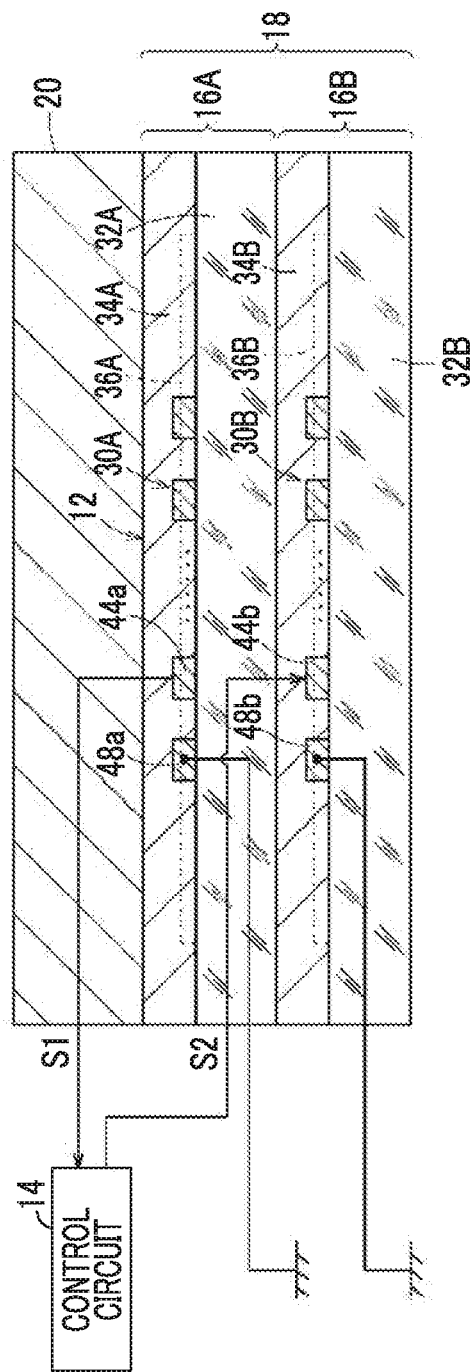
FIG. 7 is a diagram illustrating an example of the cross-sectional structure of a laminated conductive film and an example of a control system (mutual capacitance type).

In contrast, in the mutual capacitance method, as illustrated in FIG. 7, the control circuit 14 sequentially applies a voltage signal S2 for detecting a touch position to the second electrode patterns 36B and sequentially performs a sensing process (the detection of the transmission signal S1) for the first electrode patterns 36A. When a fingertip comes into contact with or approaches the upper surface of the cover layer 20, the floating capacitance of the finger is added in parallel to parasitic capacitance (initial capacitance) in the intersection portion 62 which faces the touch position. Then, the waveform of the transmission signal S1 from the first electrode pattern 36A corresponding to the intersection portion 62 is different from the waveforms of transmission signals S1 from the first electrode patterns 36A corresponding to other intersection portions 62. Therefore, the control circuit 14 calculates the touch position on the basis of the order in which the voltage signal S2 is applied to the second electrode patterns 36B and the transmission signal S1 supplied from the first electrode pattern 36A.

The use of the touch position detection method, such as the self-capacitance method or the mutual capacitance method, makes it possible to detect each touch position even when two fingers come into contact with or approach the upper surface of the cover layer 20 at the same time.

In addition, techniques related to a projected-capacitive detection circuit are disclosed in, for example, U.S. Pat. Nos. 4,582,955A, 4,686,332A, 4,733,222A, 5,374,787A, 5,543,588A, 7,030,860B, and US 2004/0155871A.

Next, a preferred aspect of the conductive film according to this embodiment will be described below.

The metal wires forming the first terminal wiring portion 44a, the second terminal wiring portion 44b, the first terminal portion 50a, the second terminal portion 50b, the first ground line 48a, the second ground line 48b, the first ground terminal portion 46a, and the second ground terminal portion 46b are made of a single conductive material and the thin metal wires forming the first electrode pattern 36A and the second electrode pattern 36B are made of a single conductive material. The single conductive material is a metal material, such as silver, copper, or aluminum, or an alloy including at least one of them.

The opening ratio of the first conductive film 16A and the second conductive film 16B according to this embodiment is preferably equal to or greater than 85%, more preferably equal to or greater than 90%, and most preferably equal to or greater than 95% in terms of visible light transmittance. The opening ratio is the proportion of a translucent portion other than the thin metal wires to the conductive film. For example, the opening ratio of a square lattice with a wire width of 6 µm and a thin wire pitch of 240 µm is 95%.

Figure 8:
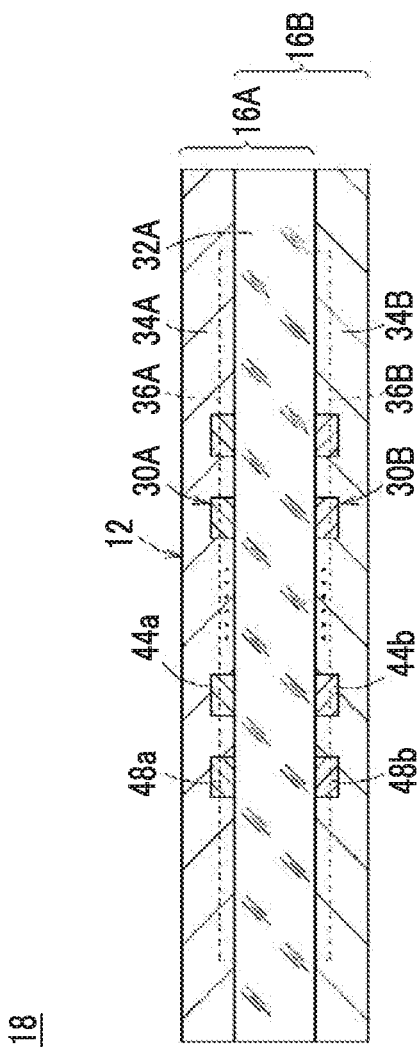
FIG. 8 is a diagram illustrating another example of the cross-sectional structure of the laminated conductive film.

In the laminated conductive film 18, for example, as illustrated in FIG. 2, the first conductive portion 30A is formed on the front surface of the first transparent base 32A and the second conductive portion 30B is formed on the front surface of the second transparent base 32B. However, as illustrated in FIG. 8, the first conductive portion 30A may be formed on the front surface of the first transparent base 32A and the second conductive portion 30B may be formed on the rear surface of the first transparent base 32A. In this case, the second transparent base 32B is not provided, the first transparent base 32A is stacked on the second conductive portion 30B, and the first conductive portion 30A is formed on the first transparent base 32A. In this case, the first transparent adhesive layer 34A is formed so as to cover the first conductive portion 30A and the second transparent adhesive layer 34B is formed so as to cover the second conductive portion 30B. In addition, other layers may be interposed between the first conductive film 16A and the second conductive film 16B, or the first electrode pattern 36A may face the second electrode pattern 36B so as to be insulated from each other.

As illustrated in FIG. 1, it is preferable that first alignment marks 64a and second alignment marks 64b for positioning which are used when the first conductive film 16A and the second conductive film 16B are bonded to each other are formed at, for example, each corner of the first conductive film 16A and the second conductive film 16B, respectively. In a case in which the first conductive film 16A and the second conductive film 16B are bonded to form the laminated conductive film 18, the first alignment marks 64a and the second alignment marks 64b become new composite alignment marks. The composite alignment marks also function as alignment marks for positioning which are used when the laminated conductive film 18 is provided in the display panel 24.

In the above-mentioned example, the first conductive film 16A and the second conductive film 16B are applied to the projected capacitive touch panel 10. However, the first conductive film 16A and the second conductive film 16B may be applied to a surface capacitive touch panel or a resistive touch panel.

The first conductive film 16A and the second conductive film 16B according to this embodiment may be used as electromagnetic wave shield films of the display device 22 or optical films provided in the display panel 24 of the display device 22, in addition to the conductive films for the touch panel of the display device 22. Examples of the display device 22 include a liquid crystal display, a plasma display, an organic EL display, and an inorganic EL display.

Next, as a representative example, a method for manufacturing the first conductive film 16A will be described in brief. The second conductive film 16B is manufactured by the same method.

As a method for manufacturing the first conductive film 16A, for example, a photosensitive material that has an emulsion layer including a photosensitive silver salt halide may be exposed and developed to form a metal silver portion and a translucent portion in an exposed portion and an unexposed portion, respectively, thereby forming the first conductive portion 30A on the first transparent base 32A. In addition, a physical development process and/or a plating treatment may be further performed for the metal silver portion such that conductive metal is supported on the metal silver portion.

Alternatively, the first conductive portion 30A may be formed as follows: a photosensitive layer to be plated is formed on the first transparent base 32A, using a pre-plating treatment material; and an exposure process, a development process, and a plating treatment are sequentially performed for the photosensitive layer to form a metal portion and a translucent portion in an exposed portion and an unexposed portion, respectively. In addition, a physical development process and/or a plating treatment may be further performed for the metal portion such that conductive metal is supported on the metal portion.

The following two aspects are given as a preferred example of a method using the pre-plating treatment material. The detailed content of the following aspects are disclosed in, for example, JP2003- 213437A, JP 2006-64923A, JP 2006- 58797A, and JP 2006- 135271A.

(a) An aspect in which a layer to be plated having a functional group that interacts with a plating catalyst or a precursor thereof is applied onto the first transparent base 32A and an exposure process, a development process, and a plating treatment are sequentially performed for the layer to form a metal portion on a material to be plated.

(b) An aspect in which an underlayer including a polymer and a metal oxide and a layer to be plated having a functional group that interacts with a plating catalyst or a precursor thereof are formed on the first transparent base 32A in this order and an exposure process, a development process, and a plating treatment are sequentially performed for the layers to form a metal portion on a material to be plated.

As another method, a photoresist film on a copper film which is formed on the first transparent base 32A may be exposed and developed to form a resist pattern and the copper film which is exposed from the resist pattern may be etched to form the first conductive portion 30A.

Alternatively, paste including fine metal particles may be printed on the first transparent base 32A. Then, the paste may be plated with metal to form a mesh pattern.

Alternatively, a mesh pattern may be printed on the first transparent base 32A by a screen printing plate or a gravure printing plate.

Alternatively, the first conductive portion 30A may be formed on the first transparent base 32A by an inkjet method.

Next, the description will be focused on a method using a photosensitive silver halide photographic material, which is a particularly preferred aspect, in the first conductive film 16A according to this embodiment. This holds for the second conductive film 16B.

A method for manufacturing the first conductive film 16A according to this embodiment includes the following three aspects, depending on photosensitive materials and development processes.

(1) An aspect in which a photosensitive silver halide black-and-white photographic material without including a physical development nucleus is chemically or thermally developed to form a metal silver portion on the photosensitive material.

(2) An aspect in which a photosensitive silver halide black-and-white photographic material including physical development nuclei in a silver halide emulsion layer is dissolved and physically developed to form a metal silver portion on the photosensitive material.

(3) An aspect in which a photosensitive silver halide black-and-white photographic material without including a physical development nucleus and an image receiving sheet having a non-photosensitive layer including a physical development nucleus overlap each other and are then subjected to diffusion transfer development to form a metal silver portion on the non-photosensitive image receiving sheet.

The aspect (1) is an integrated black-and-white development type and a translucent conductive film, such as a light-transmissive conductive film, is formed on the photosensitive material. The obtained developed silver is chemically developed silver or thermally developed silver and is highly active in the subsequent plating treatment or the subsequent physical development process because it is a filament having a high-specific surface.

According to the aspect (2), in the exposed portion, silver halide grains near the physical development nuclei are dissolved and deposited on the physical development nuclei to form a translucent conductive film, such as a light-transmissive conductive film, on the photosensitive material. This aspect is also an integrated black-and-white development type. Since the development action is the deposition of silver halide on the physical development nuclei, high activity is obtained and the developed silver has a spherical shape with a small-specific surface.

According to the aspect (3), in the unexposed portion, silver halide grains are dissolved, diffused, and deposited on the development nuclei on the image receiving sheet to form a translucent conductive film, such as a light-transmissive conductive film, on the image receiving sheet. This aspect is a so-called separate type in which the image receiving sheet is separated from the photosensitive material and is then used.

In any one of these aspects, any of a negative development process and a reversal development process can be selected (in the case of a diffusion transfer method, an auto-positive photosensitive material is used as the photosensitive material, which makes it possible to perform the negative development process).

The chemical development, the thermal development, the dissolution and physical development, and the diffusion transfer development described above have the same meanings as those of the terms which are generally used in this technical field and are explained in general textbooks about photographic chemistry, for example, "Shashin Kagaku (Photographic Chemistry)" written by Shinichi Kikuchi (published by Kyoritsu Shuppan Co., Ltd. in 1955) and "The Theory of Photographic Processes, 4th ed." edited by C. E. K. Mees (published by Mcmillan Publishers Ltd in 1977). The invention relates to liquid processes, but techniques using thermal development methods as other development methods can also be referred to. For example, it is possible to apply the techniques described in JP2004-184693A, JP2004-334077A, JP2005-010752A, JP2004-244080, and JP2004-085655.

Next, the structure of each layer of the first conductive film 16A according to this embodiment will be described in detail below. This holds for the second conductive film 16B.

First Transparent Base 32A

A plastic film, a plastic plate, and a glass plate can be given as examples of the first transparent base 32A. Examples of the raw materials of the plastic film and the plastic plate include polyesters, such as polyethylene terephthalate (PET) and polyethylene naphthalate (PEN), triacetylcellulose (TAC), polycarbonate, and cycloolefin polymer (COP). The first transparent base 32A is preferably a plastic film or a plastic plate with a melting point of about 290° C. or less. In particular, the first transparent base 32A is preferably a PET plate in terms of, for example, transmittance and workability.

Silver Salt Emulsion Layer

A silver salt emulsion layer which becomes thin metal wires of the first conductive film 16A includes additives, such as a solvent and a colorant, in addition to a silver salt and a binder.

Examples of the silver salt used in this embodiment include an inorganic silver salt, such as silver halide, and an organic silver salt, such as silver acetate. In this embodiment, it is preferable to use silver halide excellent in the characteristics of an optical sensor.

The amount of silver (the amount of silver salt) applied to the silver salt emulsion layer is preferably in the range of 1 g/m$^2$ to 30 g/m$^2$, more preferably in the range of 1 g/m$^2$ to 25 g/m$^2$, and most preferably in the range of 5 g/m$^2$ to 20 g/m$^2$, in terms of silver. If the amount of silver applied is set in the above-mentioned range, it is possible to obtain desired surface electrical resistance in the case of the first conductive film 16A.

Examples of the binder used in this embodiment include gelatin, polyvinyl alcohol (PVA), polyvinylpyrrolidone (PVP), polysaccharides, such as starch, cellulose and derivatives thereof, polyethylene oxide, polyvinylamine, chitosan, polylysine, polyacrylic acid, polyalginic acid, polyhyaluronic acid, and carboxycellulose. These materials each exhibit neutral, anionic, and cationic properties depending on the ionicity of the functional group thereof.

The content of the binder in the silver salt emulsion layer according to this embodiment is not particularly limited and can be appropriately determined within a range in which dispersibility and adhesiveness can be obtained. The content of the binder in the silver salt emulsion layer is preferably 1/4 or more and more preferably 1/2 or more in terms of the volume ratio of silver/binder. The volume ratio of silver/binder is preferably 100/1 or less and more preferably 50/1 or less. The volume ratio of silver/binder is even more preferably 1/1 to 4/1. The volume ratio of silver/binder is most preferably 1/1 to 3/1. If the volume ratio of silver/binder in the silver salt emulsion layer is set in the above-mentioned range, it is possible to suppress a variation in resistance value even in a case in which the amount of silver applied is adjusted and to obtain the first conductive film 16A having uniform surface electrical resistance. The volume ratio of silver/binder can be calculated by converting the amount of silver halide/the amount of binder (weight ratio) in the raw material into the amount of silver/the amount of binder (weight ratio) and converting the amount of silver/the amount of binder (weight ratio) into the amount of silver/the amount of binder (volume ratio).

Solvent

The solvent which is used to form the silver salt emulsion layer is not particularly limited. Examples of the solvent include water, organic solvents (for example, alcohols, such as methanol, ketones, such as acetone, amides, such as formamide, sulfoxides, such as dimethylsulfoxide, esters, such as ethyl acetate, and ethers), ionic liquids, and a mixture solvent of these solvents.

Other Additives

Various additives used in this embodiment are not particularly limited. For example, known additives can be preferably used.

Structure of Other Layers

A protective layer (not illustrated) may be provided on the silver salt emulsion layer. In addition, for example, a basecoat layer may be provided below the silver salt emulsion layer.

Next, each process in a method for manufacturing the first conductive film 16A will be described.

Exposure

This embodiment includes a case in which the first conductive portion 30A is formed by a printing method. However, the first conductive portion 30A is formed by, for example, exposure and development, in addition to the printing method. That is, a photosensitive material having a silver-salt-containing layer provided on the first transparent base 32A or a photosensitive material to which photopolymer for photolithography has been applied is exposed. The exposure can be performed using electromagnetic waves. Examples of the electromagnetic waves include light, such as visible rays and ultraviolet rays, and radiation, such as X-rays. Furthermore, a light source having a wavelength distribution may be used for the exposure or a light source having a specific wavelength may be used therefor.

Development Process

In this embodiment, after the emulsion layer is exposed, a development process is further performed. A general development technique which is used for, for example, silver halide photographic films, printing paper, printing plate-making films, and emulsion masks for photomasks can be used as the development process. The development process in the invention can include a fixing process which is performed in order to remove the silver salt in the unexposed portion for stabilization. A fixing technique which is used for, for example, silver halide photographic films, printing paper, printing plate-making films, and emulsion masks for photomasks can be used as the fixing process in the invention.

It is preferable that a water washing process and a stabilization process are performed for the photosensitive material that has been subjected to the development process and the fixing process.

The mass of metal silver contained in the exposed portion after the development process is preferably 50 mass % or more and more preferably 80 mass % or more with respect to the mass of silver contained in the exposed portion before exposure. If the mass of silver contained in the exposed portion is 50 mass % or more with respect to the mass of silver contained in the exposed portion before exposure, it is possible to obtain high conductivity, which is preferable.

The first conductive film 16A is obtained through the above-mentioned process. A calendering process may be performed for the first conductive film 16A subjected to the development process. The surface electrical resistance of each transparent conductive layer can be adjusted to a desired value (in the range of 0.1 ohms/square to 100 ohms/square) by the calendering process.

Physical Development and Plating Treatment

In this embodiment, a physical development process and/or a plating treatment for causing the metal silver portion to support conductive metal particles may be performed in order to improve the conductivity of the metal silver portion formed by the exposure process and the development process. In the invention, the metal silver portion may be caused to support conductive metal particles by only one of the physical development process and the plating treatment, or the metal silver portion may be caused to support conductive metal particles by a combination of the physical development process and the plating treatment. A "conductive metal portion" includes the metal silver portion subjected to the physical development process and/or the plating treatment.

In this embodiment, the term "physical development" means a process which reduces metal ions, such as silver ions, with a reducing agent and deposits metal particles on a metal or metal compound core. The physical development is used for, for example, an instant B&W film, an instant slide film, or printing plate production. In the invention, it is possible to use techniques related to them. In addition, the physical development may be performed at the same time as the development process after exposure or may be separately performed after the development process.

In this embodiment, the plating treatment may be electroless plating (such as chemical reduction plating or displacement plating), electrolytic plating, or a combination of electroless plating and electrolytic plating. In this embodiment, a known electroless plating technique can be used as the electrolytic plating. For example, an electroless plating technique which is used for, for example, printed circuit boards can be used. It is preferable that the electroless plating is electroless copper plating.

Oxidation Process

In this embodiment, it is preferable that an oxidation process is performed for the metal silver portion after the development process and the conductive metal portion formed by the physical development process and/or the plating treatment. For example, in a case in which a slight amount of metal is deposited on the translucent portion, the oxidation process can remove the metal and adjust the transmittance of the translucent portion to about 100%.

Thickness of First Transparent Base 32A and the Like

In this embodiment, the thickness of the first transparent base 32A in the first conductive film 16A is preferably in the range of 5 μm to 350 μm and more preferably in the range of 30 μm to 150 μm. If the thickness is in the range of 5 μm to 350 μm, the desired transmittance of visible light is obtained and it is easy to treat the first transparent base 32A.

The thickness of the metal silver portion provided on the first transparent base 32A can be appropriately determined according to the thickness of paint for a silver salt-containing layer which is applied onto the first transparent base 32A. The thickness of the metal silver portion can be selected from the range of 0.001 mm to 0.2 mm, is preferably equal to or less than 30 μm, more preferably equal to or less than 20 μm, even more preferably in the range of 0.01 μm to 9 μm, and most preferably in the range of 0.05 μm to 5 μm. In addition, it is preferable that the metal silver portion has a pattern shape. The metal silver portion may have a single-layer structure or a multi-layer structure including two or more layers. In a case in which the metal silver portion is formed in a pattern shape and has a multi-layer structure including two or more layers, different color sensitivities can be given to the metal silver portion such that the metal silver portion can be exposed to light components with different wavelengths. In this case, when the metal silver portion is exposed to light components with different wavelengths, different patterns can be formed in each layer.

As the thickness of the conductive metal portion is reduced, the viewing angle of the display panel 24 increases. Therefore, it is preferable that the thickness of the conductive metal portion is minimized when the conductive metal portion is used for the touch panel 10. In addition, it is necessary to reduce the thickness of the conductive metal portion in order to improve visibility. From this point of view, the thickness of a layer made of conductive metal which is supported on the conductive metal portion is preferably less than 9 μm, more preferably equal to or greater than 0.1 μm and less than 5 μm, and most preferably equal to or greater than 0.1 μm and less than 3 μm.

In this embodiment, the thickness of the silver salt-containing layer can be controlled to form a metal silver portion with a desired thickness and the thickness of a layer including conductive metal particles can be freely controlled by the physical development process and/or the plating treatment. Therefore, it is possible to easily form a conductive film with a thickness that is less than 5 μm and preferably less than 3 μm.

In the method for manufacturing the conductive film according to this embodiment, for example, a plating treatment is not necessarily performed. The reason is that, in the method for manufacturing the conductive film according to this embodiment, the amount of silver applied in the silver salt emulsion layer and the volume ratio of silver/binder can be adjusted to obtain desired surface electrical resistance. In addition, for example, a calendering process may be performed, if necessary.

Hardening Treatment after Development Process

It is preferable to perform a hardening treatment which immerses the silver salt emulsion layer in a hardener after the development process. Examples of the hardener include dialdehydes, such as glutaraldehyde, adipaldehyde, and 2,3-dihydroxy- 1,4-dioxane, and compounds, such as boric acid, which are disclosed in JP1990-141279A (JP-H02-141279A).

For example, a functional film, such as an anti-reflection layer or a hard coating layer, may be provided in the first conductive film 16A according to this embodiment.

Calendering Process

A calendering process may be performed for the metal silver portion subjected to the development process to smooth the metal silver portion. The conductivity of the metal silver portion is significantly increased by the calendering process. The calendering process can be performed using a calender roller. In general, the calender roll includes a pair of rollers.

A metal roller or a plastic roll which is made of, for example, epoxy, polyimide, polyamide, or polyimideamide, is used the roller used in the calendering process. In particular, in a case in which emulsion layers are provided on both surfaces, it is preferable to perform the calendaring process using metal rollers. In a case in which an emulsion layer is provided on one surface, a combination of a metal roller and a plastic roller may be used in order to prevent a wrinkle. The lower limit of linear pressure is equal to or greater than 1960 N/cm (200 kgf/cm; a surface pressure of 699.4 kgf/cm$^2$), and more preferably equal to or greater than 2940 N/cm (300 kgf/cm; a surface pressure of 935.8 kgf/cm$^2$). The upper limit of linear pressure is equal to or less than 6880 N/cm (700 kgf/cm).

The application temperature of the smoothing process which is represented by the calender roller is preferably in the range of 10° C. (no temperature control) to 100° C. The more preferable temperature is in the range of 10° C. (no temperature control) to 50° C., which changes depending on the wiring density or shape of a metal mesh pattern or a metal wiring pattern, and the type of binder.

The invention can be used in combination with the techniques disclosed in Japanese Unexamined Patent Application Publications and International Publication Pamphlets respectively listed in the following Tables 1 and 2. For example, in Tables 1 and 2, notations of "JP", "A", and "WO", are omitted.

TABLE 1

| | | | | |
|---|---|---|---|---|
| 2004-221564 | 2004-221565 | 2007-200922 | 2006-352073 | 2006-228469 |
| 2007-235115 | 2007-207987 | 2006-012935 | 2006-010795 | 2007-072171 |
| 2006-332459 | 2009-21153 | 2007-226215 | 2006-261315 | 2006-324203 |
| 2007-102200 | 2006-228473 | 2006-269795 | 2006-336090 | 2006-336099 |
| 2006-228478 | 2006-228836 | 2007-009326 | 2007-201378 | 2007-335729 |
| 2006-348351 | 2007-270321 | 2007-270322 | 2007-178915 | 2007-334325 |
| 2007-134439 | 2007-149760 | 2007-208133 | 2007-207883 | 2007-013130 |
| 2007-310091 | 2007-116137 | 2007-088219 | 2008-227351 | 2008-244067 |
| 2005-302508 | 2008-218784 | 2008-227350 | 2008-277676 | 2008-282840 |
| 2008-267814 | 2008-270405 | 2008-277675 | 2008-300720 | 2008-300721 |
| 2008-283029 | 2008-288305 | 2008-288419 | 2009-21334 | 2009-26933 |
| 2009-4213 | 2009-10001 | 2009-16526 | 2008-171568 | 2008-198388 |
| 2008-147507 | 2008-159770 | 2008-159771 | 2008-235224 | 2008-235467 |
| 2008-218096 | 2008-218264 | 2008-224916 | 2008-252046 | 2008-277428 |
| 2008-241987 | 2008-251274 | 2008-251275 | 2007-129205 | |

TABLE 2

| | | | | |
|---|---|---|---|---|
| 2006/001461 | 2006/088059 | 2006/098333 | 2006/098336 | 2006/098338 |
| 2006/098335 | 2006/098334 | 2007/001008 | | |

EXAMPLE 1

Hereinafter, the invention will be described in more detail using the following examples. In the following examples, materials, the amounts of materials used, ratios, the content of processes, and the procedures of processes can be appropriately modified without departing from the scope and spirit of the invention. Therefore, the scope of the invention is not limited by the following examples.

In Examples 1 to 6 and Comparative Examples 1 and 2, conductivity (surface electrical resistance) and errors in the detection of a touch position were checked. Table 3 illustrates the breakdown and evaluation results of Examples 1 to 6 and Comparative Examples 1 and 2.

Examples 1 to 6 and Comparative Examples 1 and 2

Photosensitive Silver Halide Material

An emulsion was prepared which contained silver iodobromochloride particles having a sphere-equivalent average diameter of 0.1 µm (I=0.2% by mol, Br=40% by mol) dispersed in an aqueous medium containing 10.0 g of gelatin per 150 g of Ag.

In addition, $K_3Rh_2Br_9$ and $K_2IrCl_6$ were added to the emulsion at a concentration of $10^{-7}$ (mol/mol-Ag) to dope the silver bromide particles with Rh ions and Ir ions. $Na_2PdCl_4$ was added to the emulsion and the resultant emulsion was subjected to gold-sulfur sensitization, using chlorauric acid and sodium thiosulfate. Then, the emulsion was used as an emulsion A. Then, the amount of $K_3Rh_2Br_9$ in the emulsion A was reduced to prepare an emulsion of which the sensitivity was doubled. The emulsion was used as an emulsion B.

Formation of Photosensitive Layer

Then, the emulsion and a gelatin hardening agent were applied onto the surface of the transparent base 32 (which was made of PET in this example) such that the amount of silver applied was 10 g/m². At that time, the volume ratio of Ag/gelatin was 2/1. The thickness of the transparent base 32 was 100 µm. Multi-layer coating was performed such that the amount of emulsion B in a lower layer was 5 g/m² and the amount of emulsion A in an upper layer was 5 g/m². In this way, a photosensitive silver halide material having a photosensitive layer with a thickness of 1.5 µm was obtained.

Exposure

An exposure process was performed for the obtained photosensitive silver halide material. The first transparent base 32A with an A4 size (210 mm×297 mm) was exposed in the pattern illustrated in FIG. 4 in the first conductive film 16A and the second transparent base 32B with an A4 size (210 mm×297 mm) was exposed in the pattern illustrated in FIG. 5 in the second conductive film 16B. The exposure process was performed through a photomask having the above-mentioned patterns, using parallel light emitted from a high-pressure mercury lamp as a light source.

Development Process

| Formulation of 1 L of Developer | |
|---|---|
| Hydroquinone | 20 g |
| Sodium sulfite | 50 g |
| Potassium carbonate | 40 g |
| Ethylenediaminetetraacetic acid | 2 g |
| Potassium bromide | 3 g |
| Polyethylene glycol 2000 | 1 g |
| Potassium hydroxide | 4 g |
| pH adjusted to 10.3 | |
| Formulation of 1 L of Fixer | |
| Ammonium thiosulfate solution (75%) | 300 ml |
| Ammonium sulfite monohydrate | 25 g |
| 1,3-Diaminopropanetetraacetic acid | 8 g |
| Acetic acid | 5 g |
| Aqueous ammonia (27%) | 1 g |
| pH adjusted to 6.2 | |

The exposed photosensitive material was developed under processing conditions (development: at 35° C. for 30 seconds; fixing: at 34° C. for 23 seconds; and water washing: under running water (5 L/min) for 20 seconds), using the above-described developing agent and an automatic developing machine FG-710PTS manufactured by Fujifilm Corporation, to obtain the first conductive film 16A and the second conductive film 16B.

Assembly

The first conductive film 16A and the second conductive film 16B were stacked to form the laminated conductive film 18. The touch panel 10 was manufactured using the laminated conductive film 18.

Example 1

In Example 1, exposure patterns for the first conductive film 16A and the second conductive film 16B, particularly, the pattern width of the narrowest portion 52a in the first electrode pattern 36A and the pattern width of the narrowest portion 58a in the second electrode pattern 36B were adjusted such that the area of the intersection portion 62 was 1.6 mm².

Examples 2 to 6

Examples 2 to 6 were manufactured by the same method as Example 1 except that the areas of the intersection portions 62 were 2.0 mm², 4.0 mm², 8.0 mm², 16.0 mm², and 18.0 mm².

COMPARATIVE EXAMPLES 1 and 2

Comparative Examples 1 and 2 were manufactured by the same method as Example 1 except that the areas of the intersection portions 62 were 1.0 mm² and 20.0 mm².

Evaluation

Resistance Between Electrode Patterns

Figure 9:
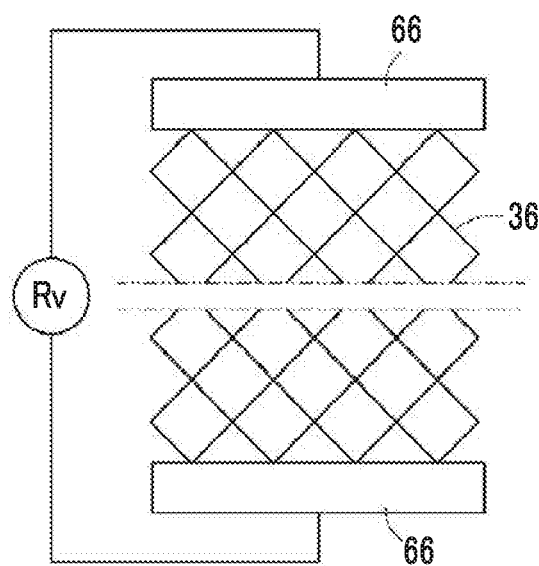
FIG. 9 is a diagram illustrating a method for measuring the resistance between the electrode patterns.

As schematically illustrated in FIG. 9, measurement terminals 66 were provided at both ends of the electrode pattern 36 and probes of a digital multimeter (Model: M500A) manufactured by PICOTEST Corporation come into contact with the measurement terminals 66 to measure resistance. In each of Examples 1 to 6 and Comparative Examples 1 and 2, 10 electrode patterns 36 with a length of 270 mm were prepared and the average resistance value thereof was used as resistance Rv between the electrode patterns.

When the value of the resistance Rv between the electrode patterns was equal to or less than 20 kiloohms, it was represented by "N". When the value of the resistance Rv was equal to or greater than 15 kiloohms and less than 20 kiloohms, it was represented by "C". When the value of the resistance Rv was equal to or greater than 10 kiloohms and less than 15 kiloohms, it was represented by "B". When the value of the resistance Rv was equal to or less than 10 kiloohms, it was represented by "A".

Detection Error

A probe robot sequentially came into contact with 10000 predetermined contact points with a diameter of 5 mm on the surface of the touch panel 10 to detect each touch position. Then, the detection results of 10000 points were compared with set values corresponding thereto. A case in which a 9973rd value from the smallest absolute value of a difference vector between the detected position and the set position was equal to or greater than 2 mm was represented by "N". A case in which the 9973rd value was equal to or greater than 1.5 mm and less than 2 mm was represented by "C". A case in which the 9973rd value was equal to or greater than 1.3 mm and less than 1.5 mm was represented by "B". A case in which the 9973rd value was less than 1.3 mm was represented by "A".

Evaluation Results

The evaluation results are shown in the following Table 3.

TABLE 3

| | Area of intersection portion (mm²) | Resistance between electrode patterns (Ω/sq.) | Detection error (%) |
|---|---|---|---|
| Comparative Example 1 | 1.0 | N | A |
| Example 1 | 1.6 | C | A |
| Example 2 | 2.0 | B | A |
| Example 3 | 4.0 | B | A |
| Example 4 | 8.0 | A | A |
| Example 5 | 16.0 | A | B |
| Example 6 | 18.0 | A | C |
| Comparative Example 2 | 20.0 | A | N |

As can be seen from Table 3, the area of the intersection portion 62 is preferably greater than 1.0 mm² and less than 20.0 mm² and more preferably equal to or greater than 2.0 mm² and equal to or less than 16.0 mm².

The conductive film according to the invention is not limited to the above-described embodiment and can have various structures without departing from the scope and spirit of the invention.

EXPLANATION OF REFERENCES

10: touch panel
12: sensor body
14: control circuit
16A: first conductive film
16B: second conductive film
18: laminated conductive film
20: cover layer
22: display device
24: display panel
26A: first sensor region
26B: second sensor region
28A: first terminal wiring region
28B: second terminal wiring region
30A: first conductive portion
30B: second conductive portion
32A: first transparent base
32B: second transparent base
34A: first transparent adhesive layer
34B: second transparent adhesive layer
36A: first electrode pattern
36B: second electrode pattern
38: cell
40: mesh pattern
52a, 58a: narrowest portion
52b, 58b: widest portion
52c, 58c: tapered portion
54, 60: envelope
62: intersection portion

What is claimed is:
1. A touch panel electrode comprising:
two or more first electrode patterns; and
two or more second electrode patterns arranged as a different layer from the first electrode patterns,
wherein the first electrode pattern and the second electrode pattern overlap each other being insulated with a distance of equal to or less than 150 μm the first electrode pattern and the second electrode pattern extend perpendicular to each other, each of the first electrode pattern and the second electrode pattern is a combination of a plurality of cells formed by thin metal wires, the first electrode pattern has narrowest portions arranged at regular intervals in a direction in which the first electrode pattern extends, each of the narrowest portions of the first electrode pattern is arranged as the same layer with the first electrode pattern, and the first electrode pattern overlaps with the second electrode pattern at at least one of the narrowest portions of the first electrode pattern, and the area of an overlapping portion between the first electrode pattern and the second electrode pattern is greater than 1 mm$^2$ and equal to or less than 4 mm$^2$.

2. The touch panel electrode according to claim 1, wherein among a plurality of cells of the second electrode pattern which are included in one overlapping portion and are arranged in a direction in which the first electrode pattern extends, a distance between a leading end of a cell that is located at one end and a leading end of a cell that is located at the other end is a first width of the overlapping portion along the first electrode pattern in a top view, among a plurality of cells of the first electrode pattern which are included in one overlapping portion and are arranged in a direction in which the second electrode pattern extends, a distance between a leading end of a cell that is located at one end and a leading end of a cell that is located at the other end is a second width of the overlapping portion along the second electrode pattern in a top view, and the area of the overlapping portion is the product of the first width and the second width.

3. The touch panel electrode according to claim 2, wherein at least four cells are arranged within the first width, and at least four cells are arranged within the second width.

4. The touch panel electrode according to claim 1, wherein, in the overlapping portion, the position of a plurality of cells forming the overlapping portion in the first electrode pattern deviates from a position of a plurality of cells forming the overlapping portion in the second electrode pattern in a top view.

5. The touch panel electrode according to claim 2, wherein, in the overlapping portion, the position of a plurality of cells forming the overlapping portion in the first electrode pattern deviates from a position of a plurality of cells forming the overlapping portion in the second electrode pattern in a top view.

6. The touch panel electrode according to claim 4, wherein cells forming the first electrode pattern and cells forming the second electrode pattern have the same size.

7. The touch panel electrode according to claim 1, wherein the surface electrical resistance of the first electrode pattern and the surface electrical resistance of the second electrode pattern are equal to or greater than 0.1 ohms/square and equal to or less than 300 ohms/square.

8. The touch panel electrode according to claim 7, wherein, in the first electrode pattern or the second electrode pattern with at least higher surface electrical resistance, the ends of the thin metal wires form a curved shape.

9. The touch panel electrode according to claim 1, wherein a gap corresponding to at least the average diameter of the cells is formed between a portion other than the overlapping portion in the first electrode pattern and a portion other than the overlapping portion in the second electrode pattern in a top view.

10. The touch panel electrode according to claim 1, wherein a gap that is equal to or greater than 200 μm is formed between a portion other than the overlapping portion in the first electrode pattern and a portion other than the overlapping portion in the second electrode pattern in a top view.

11. The touch panel electrode according to claim 1, wherein a first dummy layer which is electrically insulated from the first electrode patterns is formed between the two adjacent first electrode patterns, and a second dummy layer which is electrically insulated from the second electrode patterns is formed between the two adjacent second electrode patterns.

12. A touch panel comprising:

the touch panel electrode according to claim 1.

13. A display device comprising:

the touch panel according to claim 12.

14. The touch panel electrode according to claim 1, wherein the second electrode pattern has narrowest portions arranged at regular intervals in a direction in which the second electrode pattern extends, each of the narrowest portions of the second electrode pattern is arranged as the same layer with the second electrode pattern, and the second electrode pattern overlaps with the first electrode pattern at at least one of the narrowest portions of the second electrode pattern.

15. The touch panel electrode according to claim 1, further comprising:

a first ground line;

wherein the first ground line is formed by a thin metal wire and surrounds outside the two or more first electrode patterns.

\* \* \* \* \*